Aug. 23, 1966 J. R. FEATHERSTON 3,268,816

ADAPTIVE COMMUNICATIONS SYSTEM INCORPORATING RECEIVER SELECTION OF COMMUNICATIONS CHANNEL

Filed Nov. 22, 1963 2 Sheets-Sheet 1

INVENTOR.
JOHN R. FEATHERSTON
BY Arthur Decker
ATTORNEY

United States Patent Office 3,268,816
Patented August 23, 1966

3,268,816
ADAPTIVE COMMUNICATIONS SYSTEM INCORPORATING RECEIVER SELECTION OF COMMUNICATIONS CHANNEL

John R. Featherston, Tucson, Ariz., assignor to International Business Machines Corporation, New York, N.Y., a corporation of New York Filed Nov. 22, 1963, Ser. No. 325,644
8 Claims. (Cl. 325—302)

This invention relates to communications systems in which the carrier frequency is changed in accordance with variations in propagation efficiency and, more particularly, to a receiver for such a communications system which can adapt to receive the currently utilized carrier.

In radio systems, especially those operating at high frequencies, the variable condition of the carrier propagation medium may adversely affect the accuracy and efficiency of communications; the latter manifest as fading, distortion, etc., which, as is well known, are sharply selective as to carrier frequency. However, seasonal, diurnal, sun spot-cycle behavior and, to some extent, changes in the earth's magnetic field, and their effect on the ionosphere, may be predicted, and the influence of these on the transmission efficiencies of various carrier frequencies may also be predicted. To provide a consistent communications path, therefore, selection of carrier frequencies may be made at the transmitter in accordance with a schedule contemplating the predictions or in response to information from the receiver that the current frequency is unsuitable. It therefore becomes necessary for the receiver to respond to the carrier frequency selection made by the transmitter and it is preferable that this response be made automatically without further inquiry of the transmitter and immediately as any change is made; the present invention accomplishes this by recognizing the presence of modulation on the carrier and adapting its circuits to respond to the corresponding carrier frequency.

It is thus an object of this invention to provide a receiver which will permit the communications system to operate continuously and positively at high speeds under conditions of severe fading, distortion and interference, with the result that the probability of the release of a message containing an error by the system is exceedingly small.

It is a further object of this invention to provide, in a receiving station capable of simultaneously receiving signals of different carrier frequencies, a detection system which automatically searches for a preferred carrier and effectuates response to the preferred carrier to the exclusion of any others.

It is still another object of this invention to provide a communications system receiver which contributes to reliable contact with the transmitter regardless of modulation method, i.e., amplitude, frequency, phase, etc., modulation or a composite modulation, with minimum delay, provides that the transmitter may use as little bandwidth as possible and makes effective use of the communications channel whereby a maximum amount of information is handled for a specific amount of redundancy.

The foregoing and other objects, features and advantages of the invention will be apparent from the following more particular description of a preferred embodiment of the invention, as illustrated in the accompanying drawings.

Figure 1:
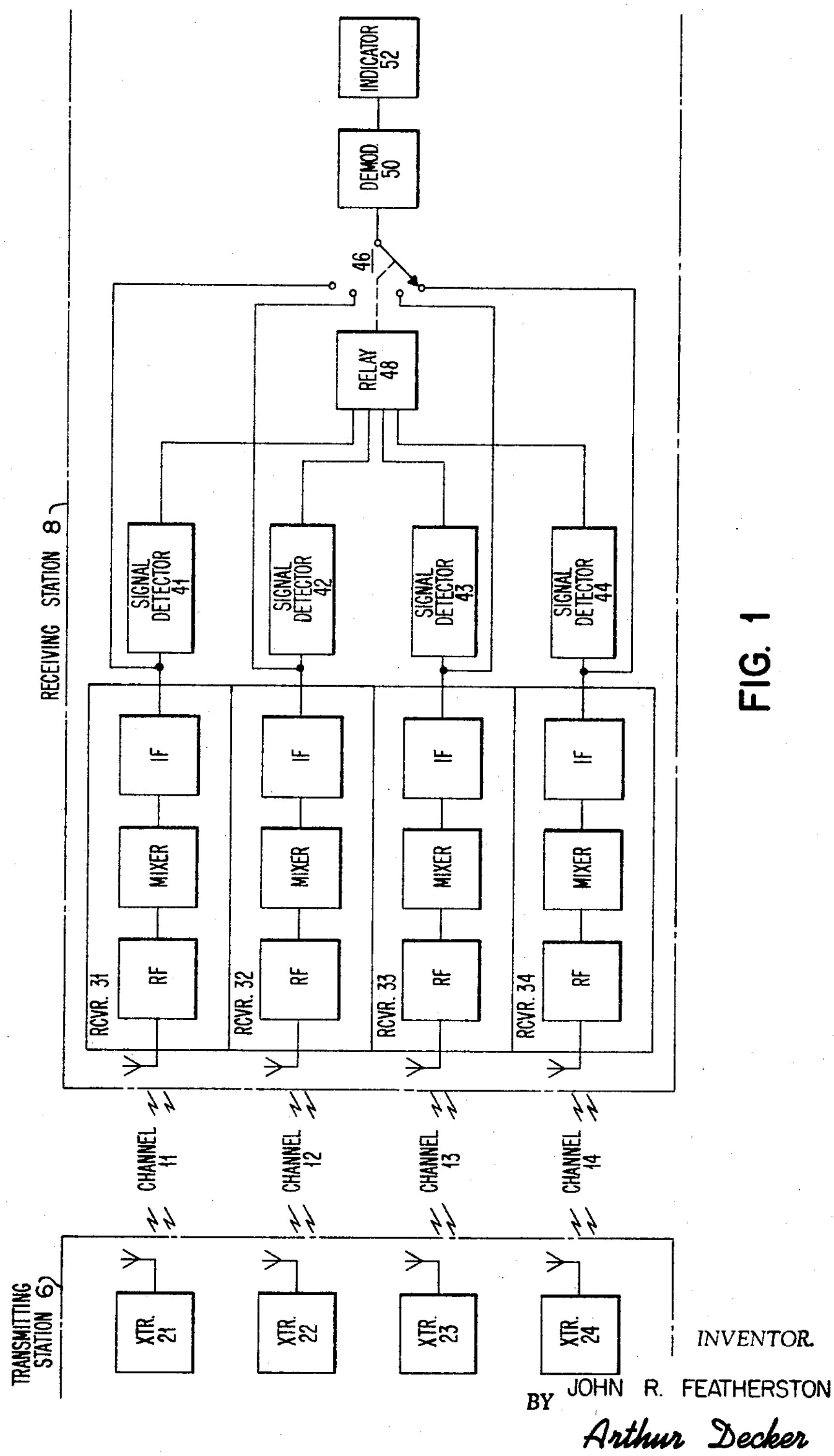
Figure 2:
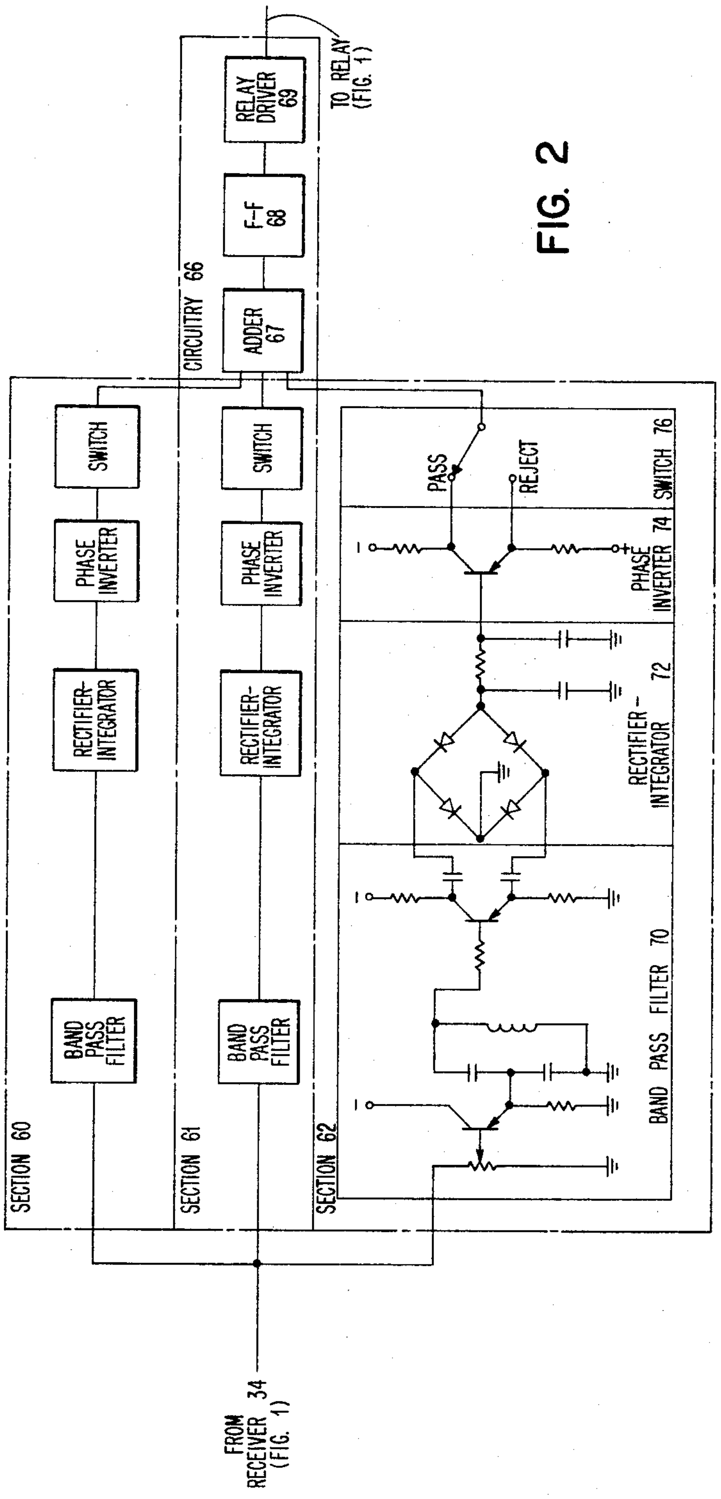

FIGURE 1 is a block diagram of a communications system in which the receiving station embodies the present invention, and FIGURE 2 is a schematic diagram of one of the novel signal detectors of FIGURE 1.

As already pointed out, this invention is associated with the receiving station of the communications system and accomplishes the above objects by recognizing the presence of modulation on that carrier of the transmitter selected for present communication by the transmitting station and adapting its circuits to respond to the selected carrier frequency, i.e., it responds to the presence or absence of data (information) and discriminates against spurious impulses (noise, foreign stations, etc.). In a typical receiving station employing the well-known superheterodyne receiving system for digital data, for instance, there may be provided a separate RF system, mixer and IF system (a combination herein designated as a receiver) for each carrier which is utilized and a demodulator (for the extraction of the information) and indicator (recorder, etc.). The function of the invention circuitry, which will be designated a signal detector, is to switch the latter two components to that receiver which is operative. A separate signal detector responds to each receiver output and operates to recognize major components, on an energy spectrum basis, of the data (i.e., modulation) waveform. The signal resulting from this recognition sets the state of a flip-flop. The combined state of the signal detector flip-flops is then used to switch the demodulator-indicator combination to the appropriate receiver. As an example, where four channels are involved, the combined state of the four signal detector flip-flops in the receiving station will indicate that, for instance, on channel 3 (between transmitter 3 and receiver 3) the possibility of data recovery exists, whereas on channels 1, 2 and 4, there is no such possibility. It is noted that the invention may falsely indicate the presence of data on a channel occupied with foreign signals which combine to produce an energy spectrum similar to that of data, but it has also been noted that this possibility is remote and in no way is to be considered detrimental to the invention's effectiveness.

To further particularize the preferred embodiment of the signal detector, included are band-pass filters tuned to frequency bands which should or should not contain energy as a result of carrier modulation. The outputs of these filters are individually rectified and then added to provide input to the flip-flop. The rectified output associated with the frequency band which is to be absent (such as that resulting from atmospheric noise), is inverted prior to the addition so that discrimination against such communication is obtained. The flip-flop output comprises one input to a network which switches the demodulator-indicator combination to the appropriate receiver.

Referring now to FIGURE 1, here is shown a communications system comprising transmitting station 6 and receiving station 8, the former including, for instance, four transmitters 21, 22, 23 and 24 and the latter including four receivers 31, 32, 33, 34, to thereby establish four communications channels 11, 12, 13 and 14, respectively. Each receiver output feeds a contact of four-throw switch 46, the arm of which, controlled by relay 48, connects to demodulator 50. Indicator 52, which may be visual, aural or even input to a recorder or computer, may be considered the system utilization device. As is apparent, this arrangement provides that, in receiving station 8, only one receiver may connect to the demodulator-indicator combination at a time. As mentioned, selection among receivers 31, 32, 33 and 34 is made by the circuit of the present invention, here embodied in signal detectors 41, 42, 43 and 44, respectively, which, as shown, are also fed signals from their respective receivers to drive relay 48, the selection being determined by which channel is affected by a modulated carrier as emitted by a transmitter in transmitting station 6. As will now be discussed, at any time, only one signal detector will indicate the presence of modulation (data) in its receiver to thereby control relay 48 to position the arm of switch 46 to select the output of that receiver.

FIGURE 2 presents, for instance, a three-section signal detector, particularly signal detector 44 of FIGURE 1, connected between receiver 34 and relay 48. The three sections 60, 61 and 62 feed into common circuitry 66 and are functionally identical; typically, section 62 comprises band-pass filter 70, rectifier-integrator 72, phase inverter 74 and switch 76. The IF output of receiver 34, which will be impressed with data modulation if channel 14 is operative and otherwise may be unmodulated or affected by spurious impulses, is received by band-pass filter 70, the tuning of which is such as to select a portion of the frequency spectrum of the modulated carrier for passage to rectifier-integrator 72. The time constant of rectifier-integrator 72 may be made sufficiently long as compared to the period of the IF, so that channel signals of any prescribed quality, as determined usually by overall communications systems specifications, may be detected. Thus, phase inverter 74, responsive to the output of rectifier-integrator 72, supplies to the contacts of switch 76, complementary voltage levels which may be manually selected by the receiving station operator according to whether the band is to be allowed to contribute to an indication of signal on indicator 52 (FIGURE 1) or rejected.

The output of sections 60, 61 and 62 of signal detector 44 are conveyed to circuitry 66 which includes adder 67, flip-flop 68 and relay driver 69, and connects as one input to relay 48 (FIGURE 1). The sum formed by adder 67 is a function of the channel 14 modulated carrier and, if sufficient, will trigger flip-flop 68 which, in turn, will energize relay driver 69 to set relay 48 so that switch 46 will connect demodulator 50 to receiver 34.

It is to be noted that the receiver selected by the signal detectors is determined by the characteristics of the band-pass filters. These characteristics are dependent, of course, on a knowledge of the factors of influence on the communications channels. It is expected that, in general, these factors will indicate that the switches in the sections of the signal detector will be set to pass the corresponding band, although under some circumtsances, such as where static or other spurious interference is encountered which can be identified as within the pass-band of a filter, the appropriate switch may be transferred to the reject position or, if the channel communication is well defined and consistent, the switches may be deleted and the filter made band-pass or band-reject, as desired, and thereby manual intervention may be avoided. For special applications, the filter characteristics for a signal detector may also overlap or gap to provide enforcement of response or rejection.

It is also appreciated that detailed description has not been provided herein for a number of circuits; those shown in block form are considered to be sufficiently well known to practitioners versed in the electronic arts to require no further explanation and those shown schematically are believed to be self explanatory.

While the invention has been particularly shown and described with reference to preferred embodiments thereof, it will be understood by those skilled in the art that the foregoing and other changes in the form and details may be made therein without departing from the spirit and scope of the invention.

What is claimed is:

1. In the receiving station of a communications system capable of responding to a plurality of carrier signals of different frequencies and having a plurality of receivers, one tuned to each carrier, means for each receiver to determine modulation on its carrier, comprising:

a plurality of filters tuned to sections of the frequency spectrum of the modulated carrier;
an integrator responsive to the output of each said filter;
an adder to sum the outputs of said integrators; and,
a circuit triggerable by the sum signal generated by said adder.

2. The combination of claim 1 wherein said filters cover the entire frequency spectrum of the modulated carrier.

3. The combination of claim 1 wherein the tuning of said filters provides overlap of response.

4. The combination of claim 1 wherein said filters are of the band-pass type.

5. The combination of claim 1 wherein said triggerable circuit comprises a flip-flop.

6. The combination of claim 1 and, complementing means for the voltage from each said integrator; and,
means to select between the voltage of each said integrator and each said complement means; and,
wherein said adder sums the outputs of said selecting means.

7. In the receiving station of a communications system including a plurality of receivers each tuned to a different carrier frequency and a single demodulator-indicator switchable among the receivers, means to control the switching so as to connect the demodulator-indicator to the receiver responding to a modulated carrier, comprising:

a plurality of band-pass filters associated with each receiver and each responsive to a portion of the energy spectrum of the modulated carrier;
means to sum the outputs of said filters; and
means to connect said summing means as a control for the receiver switching.

8. The combination of claim 7 wherein said connecting means comprises:

a bistable state circuit triggerable in response to a prescribed output from said summing means;
a switch connected to the demodulator-indicator; and,
a relay connected to said switch and responsive to the triggered one of said bistable state circuits to connect said switch to the corresponding receiver.

References Cited by the Examiner

UNITED STATES PATENTS 2,966,585 12/1960 Schultz ____________ 325—304

KATHLEEN H. CLAFFY, *Primary Examiner.*

ROBERT H. ROSE, *Examiner.*

R. S. BELL, *Assistant Examiner.*